Jan. 6, 1970   J. E. DE WEERDT ET AL   3,487,586
AUTOMATIC PROCESSING APPARATUS
Filed Dec. 21, 1965   6 Sheets-Sheet 1

Inventors
J. E. DE WEERDT
C. J. P. CLAES
By
Attorney

Jan. 6, 1970 J. E. DE WEERDT ET AL 3,487,586
AUTOMATIC PROCESSING APPARATUS
Filed Dec. 21, 1965 6 Sheets-Sheet 6

Inventors
J. E. DE WEERDT
C. J. P. CLAES
By Robert J. Corder
Attorney

United States Patent Office 3,487,586
Patented Jan. 6, 1970

3,487,586
AUTOMATIC PROCESSING APPARATUS
Jozef Emiel De Weerdt, Berlaar, and Constant Joanna Pieter Claes, Deurne, Belgium, assignors to International Standard Electric Corporation, New York, N.Y., a corporation of Delaware
Filed Dec. 21, 1965, Ser. No. 515,437
Claims priority, application Netherlands, Dec. 24, 1964, 6415061
Int. Cl. B24b 5/04, 9/00
U.S. Cl. 51—134                18 Claims

ABSTRACT OF THE DISCLOSURE

Automatic processing apparatus, such as diamond lapping equipment, for automatically sequentially processing a plurality of articles. Each article is separately processed through a first step then a second step, a third step, etc. until all particles have been processed through all the steps. A plurality of the articles, such as diamonds, are simultaneously mounted into a plurality of holders on the apparatus. Each holder is separately and sequentially brought into a working position adjacent a lapping block. The holders automatically lift and shift to expose all facets of each diamond to a complete processing.

---

This invention relates to automatic lapidarian processing apparatus for processing lapidarian articles mounted in a holder a plurality of times, said apparatus including first displacement means for displacing said articles into operative engagement with processing means in order to process said article, and out of operative engagement with said processing means when a said process is finished, and a second displacement means for displacing said article when a said process is finished along a trajectory different from that along which it is displaced by said first displacement means.

Such an apparatus is already known in the art wherein the articles are diamonds and, the processing apparatus is a lapping disc and each process consists of lapping a flat face on a diamond. This known apparatus includes only a single diamond holder so that another diamond must be mounted in this diamond holder each time a diamond has been processed completely. This is obviously a time consuming operation.

It is therefore an object of the present invention to provide an apparatus of the above type, but which does not present the drawback mentioned.

The apparatus according to the present invention is characterized in that it includes a plurality of said article holders.

Another object of this invention is to provide apparatus wherein the first and second displacement means co-operate in such a manner that said plurality of articles are successively brought into operative engagement with said processing means.

Still another object of this invention is to provide apparatus wherein that said first and second displacement means co-operate in such a manner that each time an article has been processed once another article is brought into operative engagement with said processing means.

The above mentioned and other objects and features of the invention will become more apparent and the invention itself will be best understood by referring to the following description of an embodiment taken in conjunction with the accompanying drawings wherein:

Figure 1:
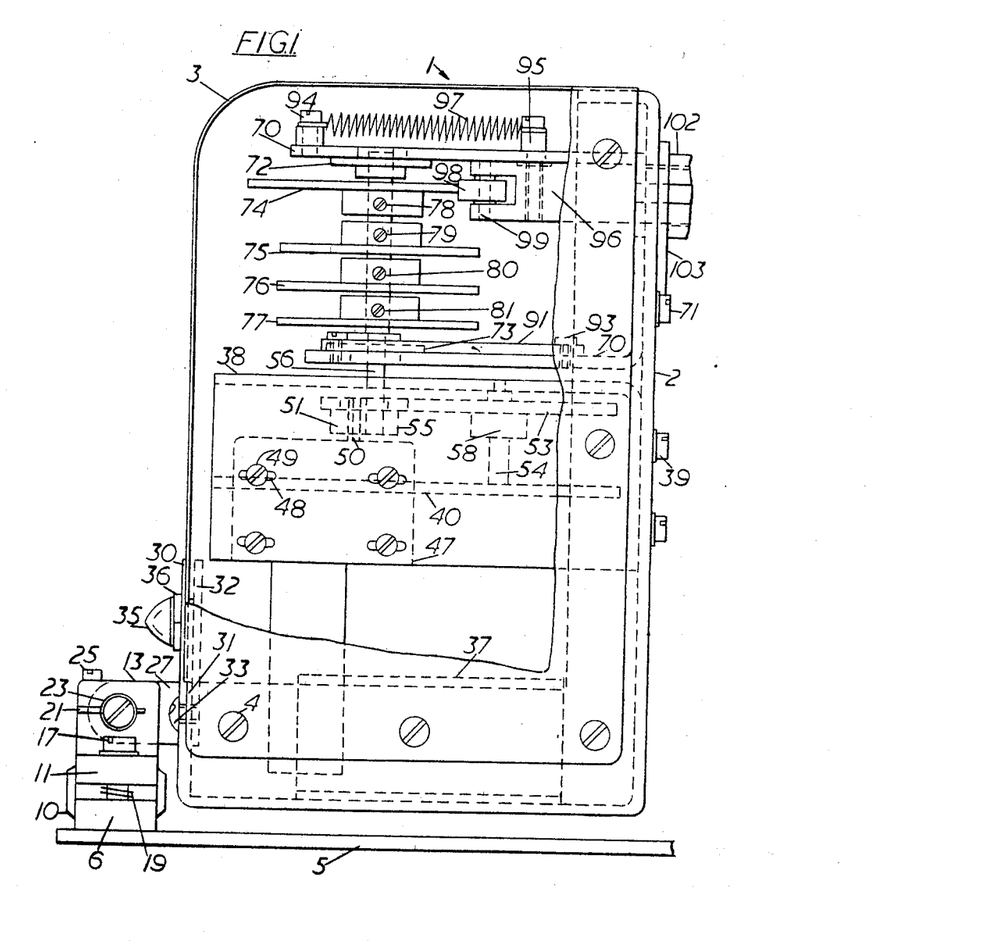
FIGS. 1 and 2, when arranged next to each other, represent a side view of an apparatus according to the invention.
Figure 2:
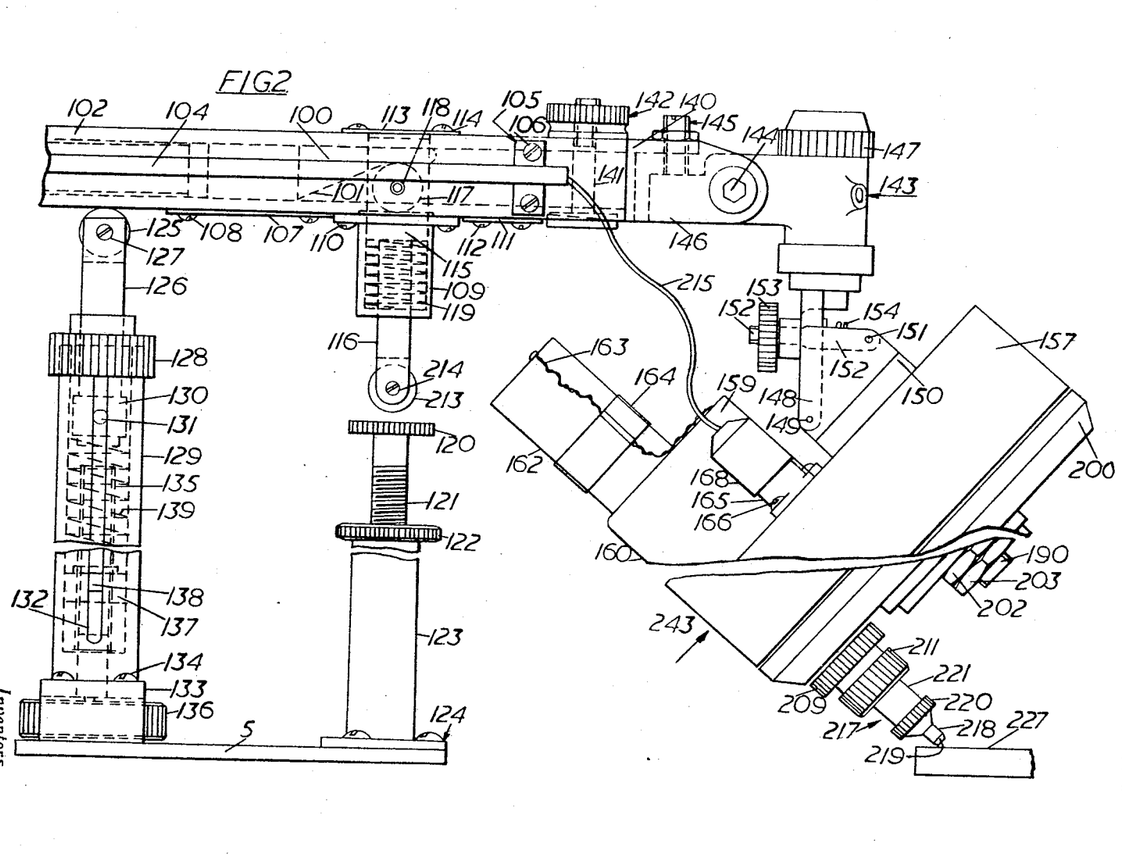

Principally referring to FIGS. 1 and 2, the present apparatus includes a housing 1 which is constituted by a substantially U-shaped supporting bracket 2 and a cover 3 fixed to this bracket 2 by means of screws such as 4. Bracket 2 is able to pivot with respect to a horizontal supporting plate 5 as it is mounted on the latter plate 5 in the following manner. A block-shaped piece 6 secured to the supporting plate 5 by means of screws such as 7 is provided with a cylindrical cavity 8 in its centre portion and with two cavities 9, 9' near to its ends. A cylindrical bearing roller 10 is mounted in this cavity 8 and supports a bracket 11 which is also provided in its centre portion with a cylindrical cavity 12. Bracket 11 is integral with two parallel parts 13, 14 which are perpendicular to it and provided near each of its ends with a cavity 15, 16. This bracket 11 is fixed on the supporting plate 5 by means of screws 17, 18 passing through the cavities 9, 15 and 9', 16 respectively and each compressing a helical spring 19, 20 arranged in these cavities. The above parts 13, 14 are each provided with a respective slit 21, 22 and with a threaded opening wherein a screw 23, 24 is fixed, a further screw 25, 26 being fixed in each of the parts 13, 14, in order to rigidly secure the screws 23, 24.

It should be noted that by operating the screws 17, 18 it is possible to adjust the position of the housing 1 in a plane perpendicular to the axis of the cylindrical bearing roller 10.

The screws 23, 24 are pin-shaped at their ends and these pins are inserted in a part 27 in such a manner that the latter part 27 is able to pivot about the axle provided by these pins. Part 27 is secured to bracket 2 by means of screws 28, 29 so that this bracket is also able to pivot about the axis provided by the pin-shaped ends of the screws 23, 24.

Figures 9, 10:
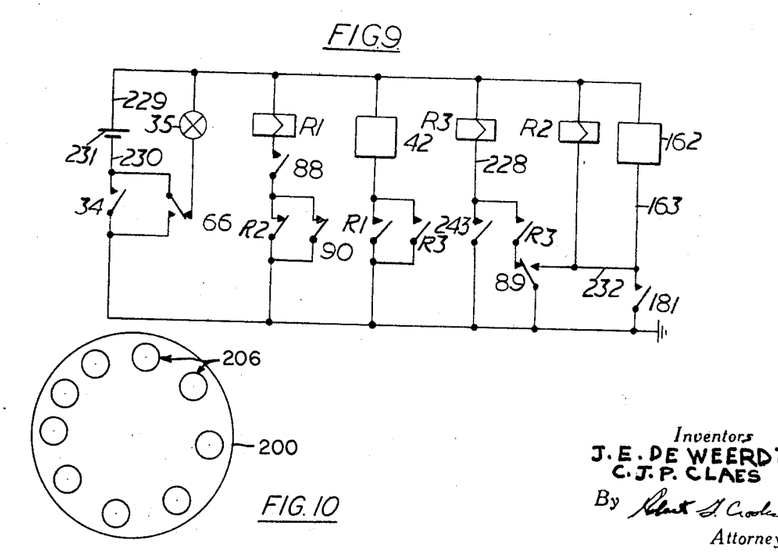
FIG. 9 is a schematic view of an electric control circuit included in the apparatus of FIG. 1.
FIG. 10 is a schematic showing of a bottom view of FIG. 4 illustrating the apparatus equipped with a plurality of diamond holders.

To the rear part of the substantially U-shaped bracket 2 three rectangular plates 30, 31, 32 (FIG. 1) are secured by means of screws such as 33, the plates 30 and 32 delimiting a channel into which the lower end of the cover 3 is located. To the plate 30 are secured a start knob 34, a control lamp 35 and a female electric supply socket 36, and an electric device 37 (FIG. 1) is mounted at the bottom of the bracket 2. This electric device includes three relays R1, R2, R3 and their respective contacts r1, r2, r3, r'3 (FIG. 9). A support plate 38 is fixed to bracket 2 by means of screws such as 39 and another support plate 40 is secured to the support plate 38 by means of column-shaped pieces such as 41, 42 and screws such as 43, 44, 45, 46. An electric driven lift motor 47 is secured to a lateral wall of the suport plate 38 by means of screws such as 48 which are each displaceable in an elongated slot 49 in such a manner that the horizontal position of the lift motor 47 may slightly be adjusted. On the shaft 50 of the lift motor 47 a gear wheel 51 is fixed by means of a screw 52. This gear wheel 51 meshes with a gear wheel 53, the axle 54 of which is rotatably mounted in the supoprt plates 38 and 40. Gear wheel 53 meshes with a gear wheel 55 which is secured to shaft 56 by means of screws 57, this shaft 56 is carrying a number of cams as will be described later. Gear wheel 53 is integral with a coaxial gear wheel 58 meshing with gear wheel 59 the axle 60 of which is rotatably mounted in the support plates 38 and 40. The gear wheel 59 is integral with a coaxial gear wheel 61 meshing with a gear wheel 62 the axle 63 of which is rotatably mounted in the support plate 38 and extends with its other end downwardly through the support plate 40, a cylindrical collar bearing 64 being interposed between the gear wheel 62 and the latter support plate 40. A cam 65 is secured to the lower end of the axle 63 and is in contact with a roller 237 (FIG. 7) forming part of a micro-switch 66 which is secured to a plate 67 by means of screws such as 68, the latter plate 67 being fixed on the support plate 40 by screws such as 69. The above gear wheels 51, 53, 55, 58, 59, 61, 62 have been so chosen that for each rotation of the motor shaft 50 cam 65 makes 1/36 of a rotation, whereas cam shaft 56 makes one rotation.

A substantially U-shaped support bracket 70 is fixed to bracket 2 by means of screws such as 71. The above mentioned cam shaft 56 is rotatably mounted in bearings 72, 73 secured to the upper and lower parts of the support plate 70 respectively. Cams 74, 75, 76, 77 are fixed on shaft 56 by means of respective screws 78, 79, 80, 81 and cams 75 to 77 are each in contact with a respective roller 82, 83, 84 (FIG. 7) which is mounted in a freely rotatable manner at the end of a movable armature 85, 86, 87 of a micro-switch 88, 89, 90. These three micro-switches 88 to 90 are fixed on a plate 91 by means of the screws such as 92, whereas the plate 91 is secured to the support plate 70 by screws such as 93. It should be noted that in order to make FIG. 1 more clear the elements 82 to 90 and 92 have not been shown therein.

On the upper part of support plate 70 is fixed a screw 94 which is connected by means of a spring 97 to another screw 95 fixed on a cylindrical pusher element 96. The one end of this pusher element 96 is U-shaped and a roller 98 is mounted in a freely rotatable manner about a pivot 99 secured between the parallel arms of this U-shaped end. Roller 98 is constantly urged into contact with the peripheral surface of cam 74 by spring 97. The cylindrical pusher element 96 is provided at its other end with a flat part 100 having an inclined lower surface 101. This pusher element 96 is slidably mounted in a hollow arm 102 which is integral with a bracket 103 (FIG. 1) secured to bracket 2 by means of the above mentioned screws 71. The hollow arm 102 has a rectangular cross-section and along one of its lateral faces a protecting sleeve 104 for an electric cable 215 (FIG. 2) including two wires 229, 232 (FIG. 9) is fixed by means of a small plate 105 and screws 106, this sleeve 104 being led through an opening in the bracket 2 into the interior of the housing 1. At its lower part arm 102 is provided, over a part of its length, with a small longitudinal slot (not visible) covered by a small plate 107 fixed by the screws 108. To the arm 102 are also fixed a housing 109 by screws 110 and a small plate 111 by screws 112. Also at its upper part arm 102 is provided with a small slit (not visible) covered by a small plate 113 fixed by the screws 114. The above slits are provided in order to facilitate the assembly of the elements.

The flat part 100 of pusher element 96 is arranged between the parallel arms of a U-shaped part 115 integral with a downwardly extending rod 116 which is partially located in the housing 109 and passes through an aperture in the bottom plate of this housing. Due to the end 100 of arm 102 being located between the parallel arms of the U-shaped part 115, this arm 102 is only able to be displaced in a vertical plane. A roller 117 is rotatably mounted about a pivot 118 fixed between these parallel arms and is constantly urged into contact with the inclined surface 101 of the end 100 by a helical spring 119 which is mounted between the lower wall of the housing 109 and the part 115 which forms a collar. Likewise the lower part of rod 116 is U-shaped and a roller 213 is rotatably mounted about a pin 214 fixed between the parallel arms of this U-shaped part. Below roller 13 is mounted a flat knob 120 integral with a threaded rod 121 which is screwed in another flat knob 122. The latter knob 122 is itself screwed on the upper end of a tubular housing 123 which is secured to the support plate 5 by means of screws such as 124. In this manner the position in height of the flat knob 120 may be regulated.

The arm 102 is supported by a roller 125 mounted in a freely rotatable manner between the parallel arms of the U-shaped end of a rod 126 by means of screws 127 extending between these arms. The rod 126 projects through an opening in a flat knob 128 into a tubular housing 129 onto which knob 128 is screwed. At its lower end rod 126 is provided with a collar 130 into which is screwed a transverse pin 131. This pin 131 is able to slide in a longitudinal slot 132 of the housing 129 which is integral with a bridge-shaped support 133 fixed on the support plate 5 by means of screws such as 134. A threaded rod 135 which is integral with a flat knob 136, arranged below the bridge-shaped support 133, is supported by an internal collar (not shown) of the housing 129. On this threaded rod is screwed a nut 137 which is provided with a lateral stud 138 engaged in the above slot 132 to prevent the nut 137 from turning about its axis. A helical spring 139 is mounted between collar 130 and nut 137 so that by screwing knob 136 nut 137 will be displaced upwardly or downwardly and spring 139 will accordingly be more or less compressed. Consequently the downward displacement of the arm 102 under influence of the weight of the apparatus will be counter-acted by the pre-tensional spring 139. Thus, the pressure with which the diamond 219 is brought into contact with a lapping disc 227 is adjusted by actuation of nut 136.

Figure 4:
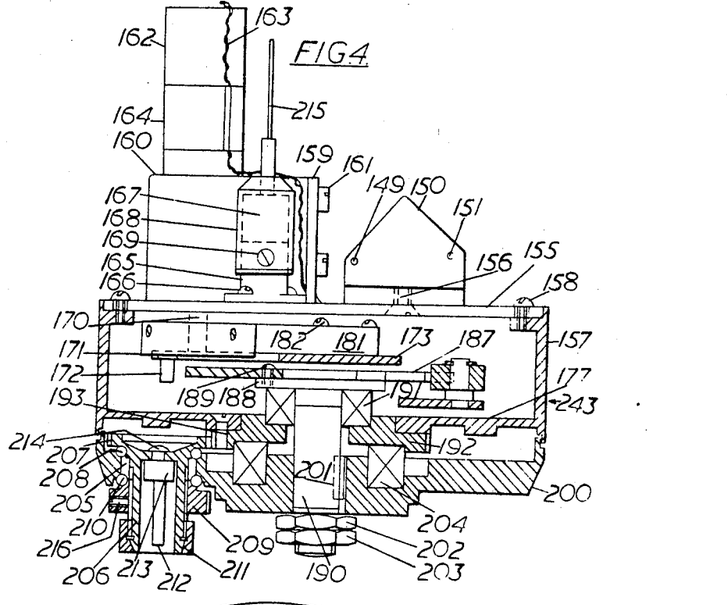
FIG. 4 is a side view partially in section along line IV—IV of FIG. 5.
Figure 5:
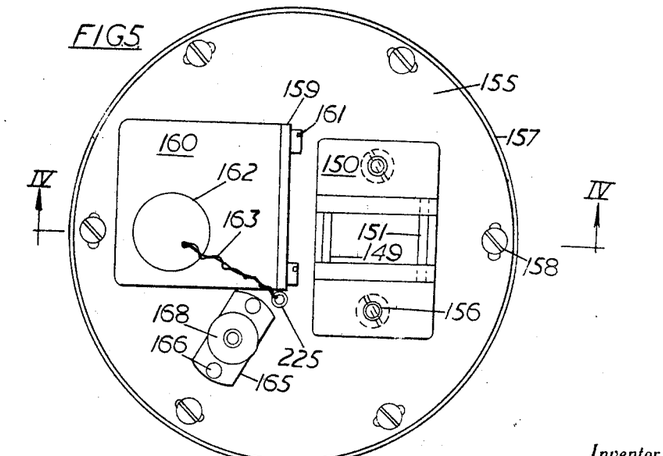
FIG. 5 is a top view of a part of the apparatus of FIG. 1.
Figure 6:
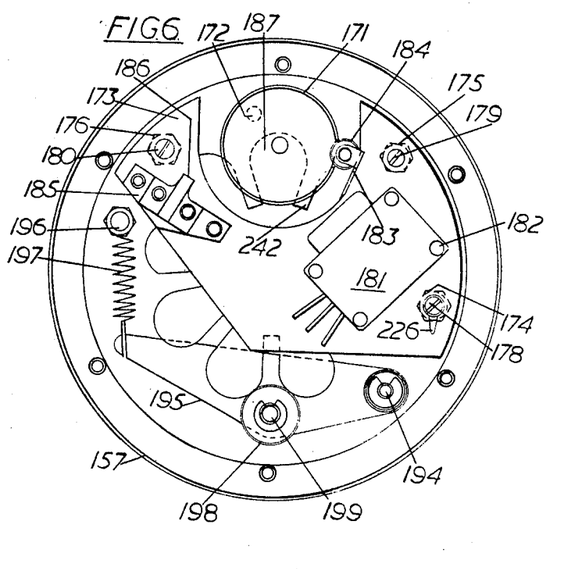
FIG. 6 is a top view of the part shown in cross-section in FIG. 4.

In the hollow end of arm 102 a support part 140 is inserted and fixed by means of a T-shaped piece 141 and a knob 142 screwed on the threaded rod of this T-shaped piece 141. This threaded rod is arranged in a hole of the arm 102 whereas the transverse part of piece 141 is located in a cavity of arm 102. This support 140 is prevented from pivoting about the axis of arm 102. The end of support 140 is U-shaped and between the parallel arms thereof another support 143 is fixed by means of a fixing element 144. In order to be able to regulate the vertical position of support 143 before solidly fixing this support by means of the fixing element 144, a regulating screw 145 is mounted in the upper part of arm 102, and the end of this screw abuts against an extension 146 of support 143. Part 147 is rotatably mounted in the support 143 and is provided with a downward extension 148 which is pivoted about a pin 149 fixed between two parallel arms of a bracket 150 secured to a circular disc 155 (FIGS. 4, 5, 6). In its upper part the support 143 is provided with a level (not shown) permitting the control of its horizontal position. Between the above arms of bracket 150 a pin 151 is also fixed about which a threaded T-shaped piece 152 is pivoted at its transverse end. The end of the other arm of this piece 152 projects beyond the extension 148 and is provided with a knob 153. A helical spring 154 is arranged around piece 152 and abuts on the one hand against the above transverse end thereof and on the other hand against the above extension 148. By operating the knob 153 it is hence possible to regulate the inclination of the bracket 150 with respect to the vertical axis of part 143.

Principally referring to FIGURES 2 and 4 to 6, a housing 243 carrying diamond holders and means for displacing the latter will now be described. The above disc 155 is secured to bracket 150 by means of screws such as 156 and is itself fixed on a flange of a cup-shaped part 157 by screws such as 158. It is moreover integral with a perpendicular plate 159 on which a speed reducer 160 is fixed by means of screws such as 161. This speed reducer 160 is coupled to the shaft of the shift motor 162. The supply cable 163 including two wires is fixed by a tape 164 around the housing of motor 162 and passes through an opening 225 in the disc 155. Finally an electric socket 165 is fixed on the circular disc 155 by means of screws 166 and a plug 167 connected with cable 215 is introduced in the socket 165, a cap 168 protects both the plug and the socket and is fixed to the socket by screw 169.

The speed reducer output shaft 170 which rotates at a smaller speed than that of the shaft of shift motor 162 is connected to a disc 171 the peripheral surface of which is provided with a cylindrical cavity (not shown), whereas one of its flat surfaces is integral with a stud 172. This disc 171 is located above a cut in a support plate 173 which is fixed by means of respective screws 178, 179, 180 on three column-shaped pieces 174, 175, 176 integral with the bottom plate 177 of the cup-shaped part 157. Screw 178 fixes terminal 226. On support plate 173 a micro-switch 181 is fixed by means of screws such as 182. This micro-switch 181 is provided with a movable armature 183 carrying a freely rotatable roller 184 which is in contact with the peripheral surface of the above disc 171. The support plate 173 also carries an insulating plate 185 which is riveted to this support plate and which is provided with a blade spring 186. Adjacent the support plate 173 is mounted a Geneva cross 187 having nine slots 242 and which is fixed to a circular flange 188 by means of screws such as 189. The circular flange 188 is integral with an axle 190. A bearing 191 is mounted between the circular flange 188 and a gear wheel 192 which is mounted in a central circular opening of the bottom plate 177 of the cup-shaped part 157 and which is fixed by means of screws such as 193. A pivot pin 194 about which a lever arm 195 is able to pivot is also secured to plate 177. At its free end the lever arm 195 is connected to a pin 196, screwed on the same bottom plate 177, by means of a spring 197. The latter spring 197 constantly urges a roller 198, which is freely rotatably mounted about a small axle 199 fixed on the lever arm 195, in contact with the Geneva cross 187. It should be noted that to make FIG. 4 clearer the above elements 194, to 199 have not been shown therein. Shaft 190 is keyed to a disc 200 by means of a key 201 and is provided at its end with a threaded part upon which are screwed a locknut 202 and a nut 203. Between the fixedly mounted gear wheel 192 and the disc 200 a bearing 204 is mounted, so that the axle 190 and the disc 200 fixed thereon are freely rotatable.

Figure 8:
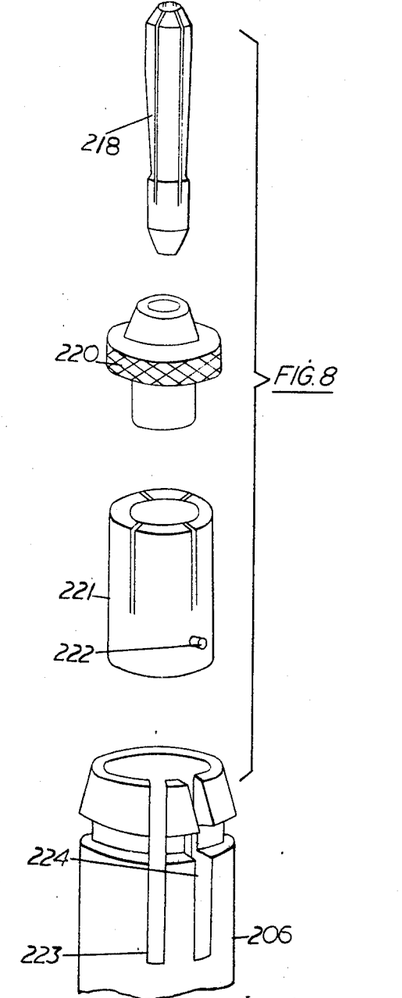
FIG. 8 is an exploded view of a part of the apparatus of FIG. 1.

As shown principally in FIGURES 2, 4 and 8, disc 200 is provided with nine circular openings such as 205 in each of which is mounted a carrier for a diamond holder, such a carrier having a threaded cylindrical part 206 integral at its other lower end with a gear wheel 207 and provided at its end with a number of small incisions (not shown) so as to enable the diameter of this end to be decreased when a fixing nut 211 with a slightly conical bore is screwed thereon. The threaded cylindrical part 206 is also provided with two parallel longitudinal slots 223, 224 (FIG. 8) disposed at an angle equal to 45° from each other. Between gear wheel 207 and disc 200 is mounted a ball bearing 208; a locknut 209 is screwed on the cylindrical part 206 and another ball bearing 210 is mounted between this nut 209 and disc 200. Locknut 209 is fixed on the cylindrical part 206 by screw 216. A stop pin 212 integral with a circular block 213 is mounted within the cylindrical part 206 and fixed by rivet 214.

In each of the cylindrical parts 206 is fixed a diamond holder 217 by means of fixing nut 211. This diamond holder is constituted of three parts, namely a slotted rod 218 the end of which is adapted to receive a diamond 219, a piece 220 comprising a frusto-conical head and a hollow cylindrical rear part, and a cylindrical part 221. Piece 220 is slid on rod 218 and cylindrical part 221 is slid on the rear part of piece 220. The latter piece 220 is provided with a lateral stud 222 which is used to correctly position the holder 217 in the cylindrical part 206 since the lateral stud 222 is inserted in one of the slots 223, 224, of the cylindrical part 206 till the slotted rod 218 abuts against the stop pin 212. Afterwards nut 211 has to be operated. It should be noted that in FIG. 2 only one diamond holder has been shown. FIG. 10 schematically shows more diamond holders circumferentially disposed about plate 200.

Figure 3:
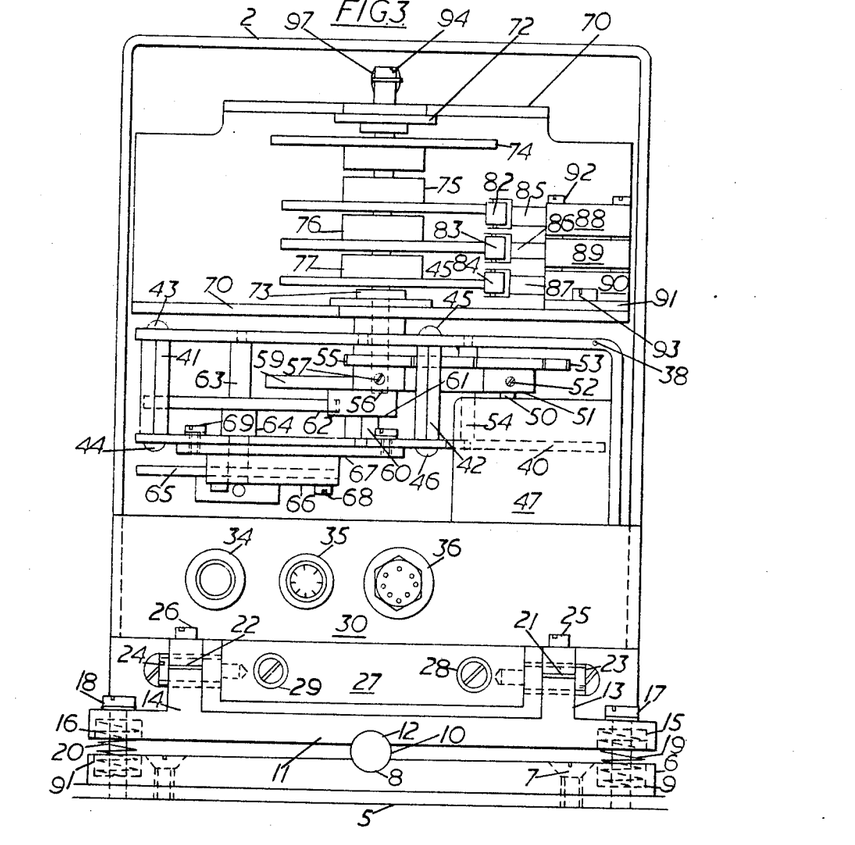
FIG. 3 is a rear view of this apparatus, the housing thereof being partially cut away.

The above diamond 219 may be brought into contact with a metallic lapping disc 227 the metal rotation shaft (not shown) of which is electrically connected via a wire 228 (FIG. 9) to a male plug (not shown) which is also connected to the two supply wires 229, 230 of a battery 231 and which is plugged into the socket 36 (FIG. 3). In the manner only shown in FIG. 9 the wires 228, 229, 230 and the mass of the apparatus which is represented by a ground, are connected to the relays R1, R2, R3, the contacts r1, r2, r3, r'3 of these relays, the start knob make contact 34, the lamp 35 and the micro-switch make contacts 66 and 88 to 90. The right hand fixed contact of the micro-switch change-over contact 89 is also connected to the wire 232 which is included in the cable 215 together with the wire 229. Via the connectors 165, 166 (FIG. 4) the wires 229, 232 are connected to the interior of the housing 243 and from there to the micro-switch 181 and to the lift motor 162. Inside this housing 243 the mass of the apparatus is coupled through the terminal blade 226 which is connected to the blade spring 186 via the micro-switch make-contact 181 which is connected on the one hand to one wire of the supply cable 163 of the shift motor 162 and on the other hand to the wire 229 via the connectors 165, 166. The other wire of the supply cable 163 is connected to wire 229 via the same plugs.

Figure 7:
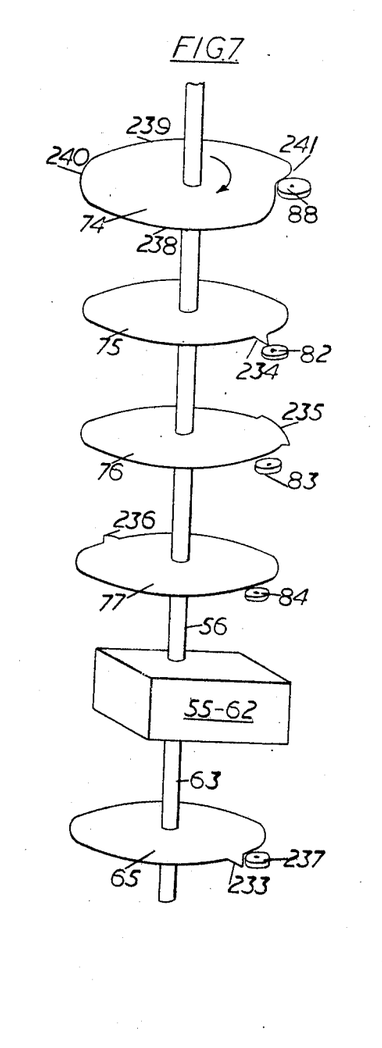
FIG. 7 is a perspective view of cams included in the apparatus of FIG. 1.

Before describing the operation of the apparatus reference is made to FIG. 7 wherein cams 65 and 74 to 77 are clearly represented. The cams 65 and 75 to 77 are substantially circular and provided with a respective cam part 233, 234, 235, 236 which when brought into contact with a respective roller 237, 82, 83, 84 operates respective micro-switch 66, 88, 89, 90. Cam 74 has a part 238 the radium of which gradually increases when considered in the direction of rotation of shaft 56 and a part 239 the radius of which gradually decreases when considered in the same direction, both these parts 238, 239 having a common maximum radius at the place indicated by 240 and a beak 241 at the place where the difference between the radii of both these parts 238, 239 is maximum. In the upper position of the arm 102 of the apparatus attained after a full operating cycle of this apparatus, i.e. after 36 rotations of the shaft 56 and a single rotation of the shaft 63, the cams 74 to 77 shown in FIG. 7 are in a position making an angle of 180°, taken in a direction opposite to that of the arrow, with the position shown in this figure. Cam 65 is then in a position making an angle of 5°, taken in the same direction, with the position shown in FIG. 7. Consequently in this position the contacts 66, 88 and 89 are in their rest position, whereas contact 90 is in its work position.

The position of the cams 74 to 77 shown in FIG. 7 is that attained after the shaft 56 has made a rotation of 180°, whereas the position of cam 65 is that attained after it has made a rotation of 5°. In this position contacts 89 and 90 are in their rest position, whereas the contacts 66 and 88 are in their work position.

The operation of the above described apparatus is as follows. Hereby it should be noted that an element is said to be grounded when it is in fact connected to the mass of the apparatus.

In the rest position (not shown) of the apparatus the arm 102 is in its upper position and the roller 98 of pusher element 96 is in contact with part 240 of the cam 74. Hence the inclined part 101 of pusher element 96 is in its outermost right position and the roller 213 carried by the rod 116 is in its lowermost position and in contact with flat knob 120, the spring 119 being compressed. As mentioned above the micro-switch contacts 66, 88, 89 are in their rest position, whereas the micro-switch contact 90 is in its work position. The lamp 35 is lit in the following circuits: positive pole of battery 231, lamp 35, micro-switch changeover contact 66 in its rest position, negative pole of battery 231.

When the start knob 34 is depressed the negative pole of the battery is grounded due to which the relay R1 is energized as follows:

Positive pole of battery 231, winding of relay R1, closed micro-switch break contact 88, closed break contact R2 of relay R2, negative pole of battery via closed start knob make contact 34.

The lift motor 42 is then operated in the following manner: positive pole of battery 231, lift motor 42, closed contact R1 of relay R1, grounded negative pole of battery 231.

By the operation of the lift motor 42 the shaft 56 carrying the cams 74 to 77 and the shaft 63 carrying the cam 65 are both rotated. As soon as the latter cam 65 leaves its rest position the micro-switch change-over contact 66 is brought into its work position, due to which the operating circuit for the lamp 35 is opened so that this lamp extinguishes, and the start knob make contact 34 is shunted so that the negative battery pole is now also grounded via contact 66. Hence relay R1 is now also energized via this contact 66 and therefore start knob 34 may be released.

By the displacement of cam 77 also make contact 90 is closed due to which break contact R2 is shunted.

When cam 74 is rotated arm 96 is gradually drawn towards the left by spring 97 so that the inclined part 101 is also moved towards the left and that rod 116 is displaced upwardly under the action of the releasing spring 119. Hence the whole apparatus is pivoted in clockwise direction about the axis determined by the pin-shaped ends of the screws 23, 24 until the arm 102 abuts against roller 125. The diamond 219 mounted in the diamond holder 217 is displaced towards the lapping disc 227 and comes into contact with that disc 227 after a certain time interval. Lapping of a flat face on the diamond 219 is then started. Meanwhile the operation of lift motor 42 is stopped. Indeed, after half a rotation of cam 75 micro-switch break contact 88 is opened by cam part 234; consequently the operating circuit of relay R1 is opened due to which this relay R1 is released; consequently due to the opening of closed make contact R1, the operating circuit of lift motor 42 is opened. It should be noted that at that moment the cams 74 to 77 are positioned as shown in FIG. 7, the contacts 89, 90 being in their rest position and the contacts 66, 88 being in their work position.

When a first flat face on diamond 219 has been lapped, the slotted rod 218 of the diamond holder 217 makes contact with the lapping disc 227 and hence with the wire 228 (FIG. 9). Through this contact, which is indicated by 243 on FIG. 9, the following operating circuit is closed for relay R3: positive pole of battery 231, winding of relay R3, wire 228, closed contact 242, grounded negative pole of battery 231.

Relay R3 is locked as follows: positive pole of battery 231, winding of relay R3, closed make contact R3, micro-switch change-over contact 89 in its rest position, grounded negative pole of battery 231.

Locking of relay R3 is necessary since the above contact 242 between rod 218 and lapping disc 227 is only maintained for a short moment since the lift motor 42 is again operated in a following circuit: positive pole of battery 231, lift motor 42, closed make contact r'3 of relay R3, grounded negative pole of battery 231. By the operation of the lift motor 42 the cams 66 and 74 to 77 are rotated. Upon passing the beak 241 of cam 74 the roller 98 is first suddenly and then slower displace towards the right. Consequently rod 116 is displaced downwardly into contact with flat knob 120 due to which the apparatus is pivoted in anti-clockwise direction (FIG. 2) thus lifting the diamond 219 from the lapping disc 227, first very rapidly and then slower.

As soon as cam 75 has started its displacement break contact 88 is again closed so that relay R1 is operated as follows: positive pole of battery 231, winding of relay R1, closed break contact 88, closed break contact r2 in parallel with closed break contact 90, grounded negative terminal of battery 231. Hence the operating circuit of lift motor 42 is now also closed through closed make contact r1.

Immediately thereafter cam part 235 of cam 76 is brought into contact with roller 83 so that micro-switch change-over contact 89 is temporarily brought in its work position. Consequently the shift motor 162 and the relay R2 are operated as follows: positive pole of battery 231, motor 162 in parallel with winding of relay R2, changeover contact 89 in its work position, grounded negative pole of battery 231.

By the temporary displacement of change-over contact 89 the relay R2 is released but the lift motor 42 remains operated although contact r'3 is opened, due to the fact relay R1 remains energized via the closed contact 90 and although break contact r2 of relay R2 is opened.

By the operation of shift motor 162 the disc 171 fixed on the output shaft 170 of the speed reducer 160 coupled with this motor is rotated. Due to this, roller 184 is moved out of the peripheral cavity of the disc 171 so that the micro-switch make contact 181 is closed for nearly the complete rotation time of this disc 171. Thus shift motor 162 and relay R2 are maintained operated.

During the complete rotation of disc 171 the pin 172 first enters a groove 242 of the Geneva cross 187 and afterwards rotates this cross in anti-clockwise direction (FIG. 6) over 40°. Consequently also the disc 200 carrying the nine holder carriers provided with a gear wheel 207 are rotated in the same direction over 40°. But since these gear wheels 207 all mesh with the fixedly mounted gear wheel 192, these gear wheels 207 are all individually rotated over a same angle which is equal to 90° due to a suitable choice of the diameters of the gear wheels 192 and 207.

When the shift movement is finished the above roller 184 is again engaged in the peripheral cavity of disc 171 so that the micro-switch make contact 181 is again opened. Due to this the operating circuit of shift motor 162 and of relay R2 is interrupted so that motor 162 is stopped and relay R2 is released. Due to this relay R1 is now also maintained energized via closed break contact r2.

At the moment the arm 102 reaches its upper position break contact 90 is opened by cam part 236 of cam 77, but this remains without effect on the operation of relay R3 since the latter is locked via contact r2. The arm 102 will hence start a second downward movement and a first flat face will subsequently be lapped on the diamond mounted in a second diamond holder which has been brought in the position shown of the first diamond holder 217 by the above shifting operation. In an analogous manner as described above a first flat face will afterwards also be lapped on the diamonds mounted in the other seven diamond holders. Subsequently a second flat face will be lapped on these nine diamonds, then a third flat face and finally a fourth flat face. The fourth face on the ninth diamond is lapped during the 36th rotation of shaft 56 at the end of which cam 65 reaches its rest position due to which contact 66 is brought in its rest position. Consequently lamp 35 is lit, thus indicating that the lapping operation is finished, and the negative pole of battery 231 is disconnected from ground. Hence relay R1 is released and lift motor 42 is stopped in the upper position of arm 102.

When during the operation of the apparatus shift motor 162 does not attain its final position due to this motor being defect or due to any other reason, micro-switch make contact 181 remains closed so that relay R2 remains operated and contact r2 in the operating circuit of R1 remains open. Hence when lift motor 42 brings arm 102 in its upper position wherein contact 90 is opened by cam part 236 of cam 77, relay R1 is released and consequently lift motor 42 is stopped.

After four flat faces have been lapped on each of the nine diamonds, each diamond holder 217 is removed out of its carrier, i.e. lateral stud 222 is removed out of slot 223, and afterwards so mounted in this carrier that lateral stud 222 is located in slot 224. When the above described operation is repeated four other flat faces are lapped on each diamond, the latter faces being interleaved with the former ones due to the angle between the slots 223 and 224 being equal to 45°. It has been found that before starting such a second operation it is preferable to rotate part 147 and hence housing 243 over 180°.

With the above apparatus four flat faces are lapped on each of nine diamonds during 36 successive operations. In general, when $n$ flat faces must be lapped on each of $m$ diamonds during $mn$ successive operations, it is clear that $m$ and $n$ must be prime with respect to each other. Instead of lapping successive faces on each diamond one could obviously also lap the faces in any order provided the latter is such that all the faces are lapped after $mn$ successive operations.

While the principles of the invention have been described above in connection with specific apparatus, it is to be clearly understood that this description is made only by way of example and not as a limitation on the scope of the invention.

What is claimed is:
1. Automatic lapidarian processing apparatus for systematically individually grinding a number of facets on a plurality of lapidarian articles,
   said apparatus including carrier plate means for simultaneously mounting a plurality of said lapidarian articles,
   first displacement means for automatically moving said carrier plate means in a first trajectory to place individual ones of said articles into operative engagement with lapping means in order to grind said articles,
   means for automatically actuating said first displacement means to move said articles from the operative engagement along said first trajectory responsive to the completion of the grinding of the one of said facets,
   second displacement means for automatically moving said carrier plate means along a second trajectory to said articles when the grinding of said one facet is completed for preparing the said plate means to present another of said articles for grinding, a plurality of individual article holders fixed in said carrier plate means for holding said articles, and
   means operated responsive to the operation of said second displacement means for rotating the individual article holders to present another facet for grinding.
2. The apparatus of claim 1, wherein
said first and second displacement means cooperate in such a manner that said plurality of articles are individually successively brought into operative engagement with said lapping means.
3. The apparatus of claim 2, wherein
said first and second displacement means cooperate in such a manner that each time one facet of one of said articles has been processed once another article is brought into operative engagement with said lapping means.
4. The apparatus of claim 3, wherein
the number $m$ of said articles and the number $n$ of said facets of each of said articles having to be ground are prime with respect to each other so that all said articles are ground after $mn$ successive grindings.
5. Automatic lapidarian processing apparatus for systematically individually grinding a number of facets on a plurality of lapidarian articles,
   said apparatus including carrier plate means for simultaneously mounting a plurality of lapidarian articles,
   means for rotatably mounting said carrier plate means,
   first displacement means for automatically moving said carrier plate means in a first trajectory to place individual ones of said articles into operative engagement with lapping means in order to grind said articles,
   means for automatically actuating said first displacement means to move said articles from the operative engagement along said first trajectory responsive to the completion of the grinding of one of said number of facets,
   second displacement means for automatically moving said carrier plate means along a second trajectory when the grinding of said one of said number of facets is completed for preparing the said plate means to present another of said articles for grinding,
   said second trajectory comprising a fixed arc,
   means whereby said first and second displacement means cooperate in such a manner that said plurality of articles are individually successively brought into operative engagement with said lapping means,
   a plurality of individual article holders fixed in said carrier plate means for holding said articles,
   gear means fixed to asid second displacement means,
   carrier gear means associated with said carrier plate for meshing with the gear means fixed to said second displacement means to rotate the carrier plate means through the fixed arc responsive to the operation of said second displacement means,
   holder gear means operated responsive to the rotation of said carrier plate means for rotating said individual article holders to present another facet of said number of facets for grinding whenever said carrier plate means is rotated through the said fixed arc whereby said first and second displacement means cooperate so that if there are $m$ number of said articles having $n$ number of said facets on each of said articles, all of said articles are completely ground after $mn$ successive grindings.
6. The apparatus of claim 5, wherein
said rotatable carrier plate means is fixed on a plate axle,
a Geneva-cross mechanisem secured to said plate axle for step-by-step displacement of said plate means, and
a first motor constituting said second displacement means for affecting said step-by-step displacement.
7. The apparatus of claim 6, wherein
said rotatable carrier plate means is mounted in a first housing,
a second housing including said first displacement means,
support arm means secured to said second housing for supporting said first housing at the opposite end thereof,
said first displacement means comprising second motor means,
a first cam driven by said second motor,
pusher element means slidably mounted in said arm,
a first spring for maintaining said first cam in operative engagement with one end of said pusher element slidably mounted in said arm, the other end of pusher element having an inclined surface,
rod means normal to said arm,
a second spring constantly maintaining said inclined surface in contact with one end of said rod means,
support means extending toward the other end of said rod meanss, whereby when said cam enables the displacement of said pusher element toward said second housing, said rod is displaced away from said support means by the action of said second spring thus enabling said arm to pivot in one direction causing said first housing to be displaced towards said lapping means and, whereby when said cam displaces said pusher element away from said second housing, said rod is displaced against the force of said second spring to bear on said support means causing said arm to pivot in a direction to displace said first housing from said lapping means.

8. The apparatus of claim 7, wherein
said arm is integral with said second housing.

9. The apparatus of claim 8, wherein
said one end of said rod is U-shaped and that said inclined surface of said pusher element is located between the parallel arms of said U-shaped end, wherein
roller means are mounted between said parallel arms contacting said pusher element.

10. The apparatus of claim 9, wherein
said second housing is pivoted about an axle mounted at one extremity of the apparatus so that said rod is urged into contact with said support under the full weight of said apparatus.

11. The apparatus of claim 10, wherein
an adjustable restraining member supporting said arm is mounted between said axle and said rod.

12. The apparatus of claim 10, wherein means are provided to adjust the height of said support.

13. The apparatus of claim 12, wherein
said first motor has a shaft carrying a first motor cam, off-normal contacts controlled by said first motor cam for controlling said second motor so that when said first motor cam has not made a complete rotation said second motor is stopped in a position, wherein said first housing is removed from operative engagement.

14. The apparatus of claim 13, wherein
said carrier plate means includes a plurality of cylindrical bodies,
said cylindrical bodies shaped to receive said individual article holders, and
central stop pin means abutting one end of said individual article holders when received in said cylindrical bodies.

15. The apparatus of claim 14, wherein
said individual article holders comprise a slotted rod shaped to receive one of said articles at its one end,
a hollow member for receiving said slotted rod,
said hollow member comprising a frusto-conical head prolonged by a tubular rear part, and a cylindrical hollow part,
said cylindrical hollow part being slidably mounted on said tubular rear part, whereby
when said individual article holders are fixedly mounted in said cylindrical bodies, said cylindrical hollow parts fit into said cylindrical bodies so that the other ends of said rods abuts against said stop pins.

16. The apparatus of claim 15, wherein
the outer wall of said cylindrical hollow part is provided with a lateral stud.

17. The apparatus of claim 16, wherein
the cylindrical bodies are provided with a plurality of longitudinal slits adapted to receive said studs of said cylindrical hollow parts, whereby
when said studs are received in different slits, different ones of said facets are ground.

18. The apparatus of claim 17, wherein
cylindrical bearing means are provided for mounting said second housing, wherein
the longitudinal axis of said cylindrical bearing means and the longitudinal axis of said arm are located in a vertical plane, wherein
said first housing is rotatable about an axis located in said vertical plane and perpendicular to said longitudinal axis of said arm, and wherein
said first housing is pivotable about an axis perpendicular to said plane.

References Cited

UNITED STATES PATENTS

| | | | |
|---|---|---|---|
| 766,783 | 8/1904 | Watson | 51—125 |
| 1,166,843 | 1/1916 | Loesser | 51—125 |
| 1,240,313 | 9/1917 | Challet. | |
| 1,331,480 | 2/1920 | Boerner | 51—125 |
| 1,458,768 | 6/1923 | Leperre | 51—229 |
| 1,923,931 | 8/1933 | Jones. | |
| 2,382,256 | 8/1945 | Radu | 51—229 X |
| 3,098,327 | 7/1963 | Malin | 51—229 X |

FOREIGN PATENTS 564,074   9/1944   Great Britain.

HAROLD D. WHITEHEAD, Primary Examiner

U.S. Cl. X.R.

51—125, 229